United States Patent
Rimini et al.

(10) Patent No.: US 7,532,664 B2
(45) Date of Patent: May 12, 2009

(54) METHOD AND APPARATUS TO ESTIMATE SIGNAL TO INTERFERENCE PLUS NOISE RATIO (SINR) IN A MULTIPLE ANTENNA RECEIVER

(75) Inventors: Roberto Rimini, San Diego, CA (US); Jukka Tapaninen, San Diego, CA (US)

(73) Assignee: Nokia Corporation, Espoo (FI)

( * ) Notice: Subject to any disclaimer, the term of this patent is extended or adjusted under 35 U.S.C. 154(b) by 724 days.

(21) Appl. No.: 10/909,607

(22) Filed: Aug. 2, 2004

(65) Prior Publication Data
US 2006/0023775 A1 Feb. 2, 2006

(51) Int. Cl.
 H04B 1/707 (2006.01)
(52) U.S. Cl. .................. 375/150; 375/147; 375/340; 375/343; 375/346
(58) Field of Classification Search .......... 375/147, 375/150, 316, 346, 347; 455/101, 132, 296; 370/335, 342
See application file for complete search history.

(56) References Cited

U.S. PATENT DOCUMENTS

| | | | | |
|---|---|---|---|---|
| 5,809,020 A * | 9/1998 | Bruckert et al. | .............. | 370/335 |
| 5,991,273 A * | 11/1999 | Abu-Dayya | .............. | 370/252 |
| 5,999,560 A * | 12/1999 | Ono | .............. | 375/148 |
| 6,028,894 A * | 2/2000 | Oishi et al. | .............. | 375/227 |
| 6,032,026 A * | 2/2000 | Seki et al. | .............. | 455/63.1 |
| 6,085,104 A * | 7/2000 | Kowalski et al. | .............. | 455/506 |
| 6,215,814 B1 * | 4/2001 | Ylitalo et al. | .............. | 375/148 |
| 6,285,861 B1 | 9/2001 | Bonaccorso et al. | .............. | 455/137 |
| 6,330,432 B1 * | 12/2001 | Tong et al. | .............. | 455/226.3 |
| 6,335,954 B1 | 1/2002 | Bottomley et al. | .............. | 375/354 |
| 6,430,237 B1 * | 8/2002 | Anvari | .............. | 375/343 |
| 6,463,295 B1 | 10/2002 | Yun | .............. | 455/522 |
| 6,466,558 B1 * | 10/2002 | Ling | .............. | 370/334 |
| 6,526,031 B1 | 2/2003 | Zaff et al. | .............. | 370/335 |
| 6,542,483 B1 | 4/2003 | Dinc et al. | .............. | 370/332 |
| 6,717,976 B1 | 4/2004 | Shen | .............. | 375/147 |
| 6,801,566 B2 * | 10/2004 | Ha | .............. | 375/148 |
| 6,822,998 B1 * | 11/2004 | Yun et al. | .............. | 375/130 |
| 7,027,496 B2 * | 4/2006 | Tapaninen | .............. | 375/227 |
| 7,069,190 B2 * | 6/2006 | Shin et al. | .............. | 702/189 |
| 7,145,935 B2 * | 12/2006 | Won et al. | .............. | 375/144 |
| 7,200,190 B2 * | 4/2007 | Malette et al. | .............. | 375/340 |
| 7,254,496 B2 * | 8/2007 | Shin et al. | .............. | 702/60 |
| 7,324,579 B2 * | 1/2008 | Yang | .............. | 375/142 |

(Continued)

Primary Examiner—David C Payne
Assistant Examiner—Leon Flores
(74) Attorney, Agent, or Firm—Harrington & Smith, PC

(57) ABSTRACT

In one aspect this invention provides a method to operate a receiver, and includes applying signals received from at least first and second antennas to corresponding first and second finger pairs, where each finger pair comprises a first finger member and a second finger member, and outputting traffic symbols and pilot symbols from each finger member; space combining weighted pilot symbols for each pair to produce a noise plus interference estimation for the pair under consideration; combining the noise plus interference estimation of each pair to generate a cumulative noise plus interference estimate; subtracting the cumulative noise plus interference estimate from an estimate of the total signal energy input to a channel decoder to generate an unbiased total signal estimate; and dividing the unbiased total signal estimate by the cumulative noise plus interference estimate to obtain an unbiased and accurate signal to interference plus noise ratio estimate that accounts for both space correlated and uncorrelated interference terms.

36 Claims, 4 Drawing Sheets

U.S. PATENT DOCUMENTS

| | | | |
|---|---|---|---|
| 2002/0044615 A1 | 4/2002 | Denno | 375/346 |
| 2002/0054621 A1* | 5/2002 | Kyeong et al. | 375/147 |
| 2002/0176516 A1 | 11/2002 | Jeske et al. | 375/316 |
| 2002/0186761 A1 | 12/2002 | Corbaton et al. | 375/231 |
| 2003/0016740 A1 | 1/2003 | Jeske et al. | 375/227 |
| 2003/0035468 A1 | 2/2003 | Corbaton et al. | 375/148 |
| 2004/0013189 A1 | 1/2004 | Jayaraman et al. | 375/233 |
| 2004/0038658 A1 | 2/2004 | Gurelli et al. | 455/226.3 |
| 2004/0053592 A1 | 3/2004 | Reial | 455/303 |
| 2004/0146094 A1 | 7/2004 | Kong et al. | 375/148 |
| 2004/0196891 A1* | 10/2004 | Tapaninen | 375/148 |
| 2005/0136840 A1 | 6/2005 | Molnar et al. | 455/63.1 |
| 2005/0152486 A1 | 7/2005 | Wang | 375/350 |

* cited by examiner

METHOD AND APPARATUS TO ESTIMATE SIGNAL TO INTERFERENCE PLUS NOISE RATIO (SINR) IN A MULTIPLE ANTENNA RECEIVER

TECHNICAL FIELD

This invention relates generally to radio frequency (RF) receivers and, more specifically, relates to SINR (Signal to Interference plus Noise Ratio) estimation methods and circuits used in RF receivers, such as in wireless communications equipment including cellular telephones and non-cellular communication devices, in particular those using multiple antennas.

BACKGROUND

In wireless communication devices, such as those commonly referred to as mobile stations (MSs), the SINR measurement is commonly used in a modulator/demodulator or modem when processing received data. In a code division multiple access (CDMA) system, the SINR, also defined as $E_b/N_t$ (bit energy to noise power ratio), is a required measurement for the MS to support a fast Forward Power Control (FPC) algorithm. The fast FPC is intended to be deployed on the forward link of a third generation CDMA system as a means to increase the forward link capacity by providing more stringent control over the transmitted power of the base station (BS). The basic idea of the FPC algorithm is that the MS determines whether a serving BS should increase or decrease the transmitted power according to its received "instantaneous" SINR, as determined by current radio channel fading conditions. Specifically, the MS requests an increase in transmitter power when it experiences a deep fading condition (low SINR), and it requests a decrease in transmitter power when it experiences good channel conditions (high SINR).

For a single antenna receiver, the MS algorithm for SINR estimation is typically implemented as follows. First, the signal power ($E_b$) is computed by squaring the coherently combined amplitudes of the power control bits (FCH) or of the traffic symbols (SCH). This coherent summation involves the active fingers (whether assigned to a multipath or to another BS path in soft hand-off). here each finger is essentially a pseudo-noise (PN) and Walsh spreading code demodulator or correlator). The total noise power is, however, computed by adding the noise power levels estimated independently for each finger, and assuming these noise terms to be uncorrelated. In the case of multiple receiver antennas, however, the inventors have realized that the interference from a dominant neighbor BS (inter-cell interference) and/or the multipath interference (intra-cell interference) typically exhibits some degree of correlation across the antennas (spatial correlation) and, therefore, the underlying assumption of independent noise terms leads to an incorrect SINR estimation. Moreover, when an Optimal Combining (O.C.) scheme based on Minimum Mean Square Error (MMSE) criteria is used at the receiver, it is reasonable to assume that that the residual interference level observed at the O.C. output would differ from the sum of the interference power levels measured on each antenna branch, as the O.C. tends to suppress the correlated interference.

SUMMARY OF THE PREFERRED EMBODIMENTS

The foregoing and other problems are overcome, and other advantages are realized, in accordance with the presently preferred embodiments of these teachings.

In one aspect this invention provides a method to operate a receiver, and includes applying signals received from at least first and second antennas to at least one finger pair. The at least one finger pair comprises a first finger member assigned to the first antenna and a second finger member assigned to the second antenna. The method further includes outputting traffic symbols and pilot symbols from each finger member; combining across the antennas (space combining) the pilot symbols output from the first finger members and from the second finger members weighted by their respective channel estimation coefficient (MRC combining) or by the MMSE weights to produce the noise plus interference estimation for this specific path. In the presence of multipath more than one finger pair is active, each one being assigned to the resolved path as determined by a finger management function. The method further includes combining the noise plus interference estimations of each finger pair to generate a cumulative noise plus interference estimate at a decoder input; subtracting the cumulative noise plus interference estimate from an estimate of the total signal energy at a channel decoder input to generate an unbiased total signal estimate; and dividing the unbiased total signal estimate by the cumulative noise plus interference estimate to obtain an unbiased signal to interference plus noise ratio estimate that captures both (space) correlated and uncorrelated interference contributions.

In another aspect thereof this invention provides a radio frequency receiver coupled to at least two antennas each coupled to a corresponding PN code correlator pair, where each PN and Walsh code correlator pair comprises a first correlator member and a second correlator member each having an input coupled to the corresponding antenna. Each correlator member outputs traffic symbols and pilot symbols. The receiver further includes a combiner for each finger pair having inputs coupled to said first and second correlator members for receiving weighted pilot symbols and spatially combining the weighted pilot symbols across the antennas to produce a first noise plus interference estimate. In the case of multipath, multiple finger pairs are active, each one assigned to a single path as determined by the finger management module. A second combiner sums the noise plus interference estimates generated by each finger pair to produce the total noise plus interference estimate at the decoder input. A subtractor generates an unbiased total signal estimate by subtracting the single noise estimate from an estimate of signal energy thus providing an accurate SINR estimate at the input to the channel decoder, and a divider, having inputs coupled to an output of the third combiner and to an output of the subtractor, outputs an unbiased signal to interference plus noise ratio estimate by dividing the unbiased total signal estimate by the single noise estimate. The SINR is accurate as it accounts for space-correlated and space-uncorrelated interference terms.

When M antennas are used at the receiver, the finger pair module is replaced by a set of M-fingers and the foregoing technique remains valid.

In a still further non-limiting embodiment of this invention there is provided a radio frequency receiver having an input for coupling to a single antenna. The receiver includes at least one spreading code correlator having an input for coupling to the single antenna and outputting traffic symbols and pilot symbols; a weighting block having inputs coupled to the correlator and outputting weighted traffic symbols and pilot symbols and a noise plus interference estimator coupled to receive weighted pilot signals to produce a noise plus interference estimate from the weighted pilot symbols. The noise plus interference estimator has a subtractor to subtract two consecutive weighted pilot symbols, a squarer to square the difference between the two consecutive weighted pilot symbols and an averager to average the squared difference over a plurality of symbols. The receiver further includes an unbiased signal to interference plus noise ratio estimator having a subtractor to subtract a cumulative noise plus interference estimate from an estimate of signal energy input to a channel decoder, that represents weighted traffic symbols, to generate an unbiased total signal estimate and a divider that outputs an unbiased signal to interference plus noise ratio estimate by dividing the unbiased total signal estimate by the cumulative noise plus interference estimate.

The various non-limiting embodiments of the receiver may be embodied in, as examples, a mobile station, a base station, or in both.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
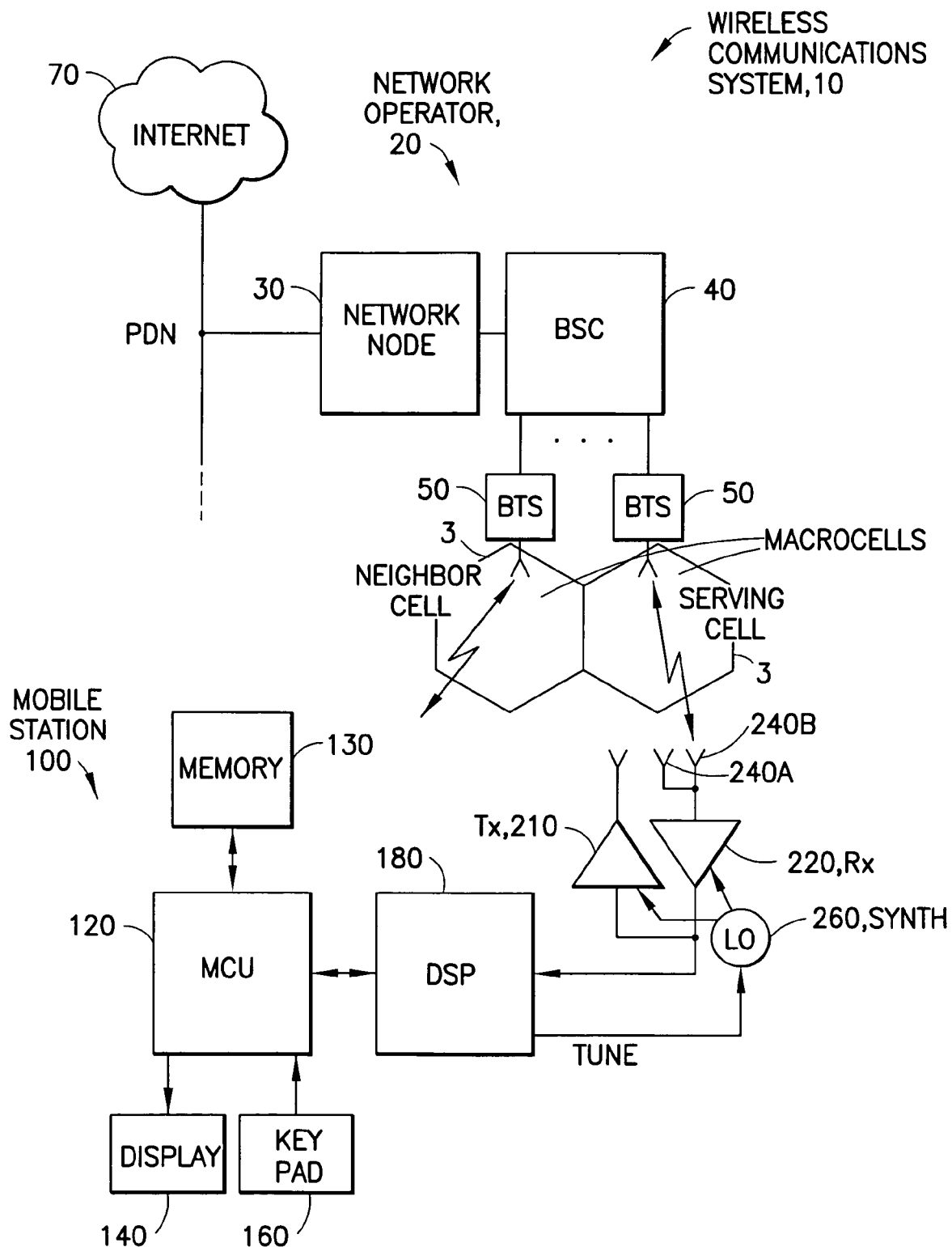
FIG. 1 is a simplified block diagram of a mobile station and a wireless network that represent one suitable embodiment for practicing the embodiments of this invention.

For the sake of simplicity, the invention description is presented for the case of a two antenna receiver. However, the various embodiments of this invention are applicable to any multitude of antennas (M antennas), where M>2, and are also applicable to the case of a single receive antenna, as will be shown below.

To overcome the above-described problems, and to provide a more accurate SINR estimation, the presently preferred embodiments of this invention compute the overall noise plus interference term from coherently combined symbols in a manner consistent with the signal power computation. More specifically, the presently preferred embodiments of this invention estimate the noise plus interference as follows:

a) The pilot symbols are multiplied by their respective weights and summed in pairs to generate the combined pilot symbols stream for each finger pair.

b) For each pair, the noise plus interference is estimated by subtracting two consecutive (space) combined pilot symbols, then squaring and averaging.

c) The overall noise plus interference power as seen at the channel decoder input is computed by summing all the noise power levels of each finger pair along the time dimension. Each pair contribution can be weighted by a finger lock status flag (1=enabled, 0=disabled). In this way the contribution to the overall noise produced by the space-correlated component is captured, and a consistent estimation of the SINR seen at the input of a signal decoder is provided.

When multiple antennas and/or multiple fingers are available at the receiver, the complex weights used to coherently combining the multipath signal components across time and space may be derived using any of a number of exemplary combining schemes.

For example, one suitable combining scheme uses a Maximal Ratio Combiner (MRC), commonly referred to as a RAKE receiver in a CDMA modem. In this case the traffic signals for each finger are weighted by their respective channel gain (complex conjugate) prior to combining. For example, in the IS-95 and IS-2000 CDMA systems the channel amplitude and phase are estimated from the filtered pilot symbols. Note that this type of combining maximizes the SNR if the noise components are uncorrelated. Under this assumption, the SNR at the combiner output is the sum of the SNR observed at the output of each correlator.

Another suitable combining scheme uses an Optimal Combiner (OC) based on the MMSE criteria. The OC exploits multiple receiver antennas not only to combat small scale fading, but also to suppress colored interference, hence maximizing the SINR. The SINR at the combiner output is greater than the sum of the SINR observed at the output of each correlator due to its interference suppression capabilities.

The presently preferred embodiments of this invention operate when a MRC, or a MMSE, combining scheme is employed at the receiver, as it measures the residual (effective) noise power level that is present at the decoder input. In addition, the weights for the O.C. approach are derived based on MMSE criteria. The algorithm used for the minimization of the MSE is the DMI (direct matrix inversion) which implement the Wiener solution, $$\underline{w}_{O.C.} = \underline{R}_{nn}^{-1} \underline{r}_{xd},$$

where $\underline{R}_{nn}$ is the noise covariance matrix and $\underline{r}_{xd}$ represents the cross correlation of the desired and the received signal, i.e. the channel estimation. The size of the $\underline{R}_{nn}$ matrix is M×M. The size of the $\underline{r}_{xd}$ vector is M×1. Other types of algorithms can be used as well to produce the weights such as, but not limited to, the Least Means Square (LMS) and Recursive Least Squares (RLS) algorithms, with no loss of generality for the invention.

In order to place this invention into a suitable technological context, and by way of introduction, FIG. 1 shows as a simplified block diagram a non-limiting and exemplary embodiment of a wireless communications system 10 that is suitable for practicing this invention. The wireless communications system 10 includes at least one mobile station (MS) 100. FIG. 1 also shows an exemplary network operator 20 having, for example, a node 30 for connecting to a telecommunications network, such as a Public Packet Data Network or PDN, at least one base station controller (BSC) 40 or equivalent apparatus, and a plurality of base transceiver stations (BTS) 50, which may also be referred to as base stations (BSs), that have transceivers for transmitting in a forward or downlink direction both physical and logical channels to the mobile station 100 in accordance with a predetermined air interface standard. A reverse or uplink communication path also exists from the mobile station 100 to the network operator, which conveys mobile originated access requests and traffic. A cell 3 is associated with each BTS 50, where one cell will at any given time be considered to be a serving cell, while an adjacent cell(s) will be considered to be a neighbor cell.

The air interface standard can conform to any suitable standard or protocol, and may enable both voice and data traffic, such as data traffic enabling Internet 70 access and web page downloads. In the presently preferred embodiment of this invention the air interface standard is compatible with a code division multiple access (CDMA) air interface standard, such as one known as cdma2000, although this is not a limitation upon the practice of this invention.

The mobile station 100 typically includes a control unit or control logic, such as a microcontrol unit (MCU) 120 coupled to a memory 130, and may have an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

In general, it should be appreciated that examples of embodiments of mobile stations 100 include, but are not limited to, cellular telephones, personal digital assistants (PDAs) having a wireless transceiver, portable computers having a wireless transceiver, image capture devices such as digital cameras having a wireless transceiver, gaming devices having a wireless transceiver, music storage and playback appliances having a wireless transceiver and handheld units or terminals that incorporate combinations of such functions.

The mobile station 100 also contains a wireless section that includes a digital signal processor (DSP) 180, or equivalent high speed processor or logic, as well as a wireless transceiver that includes a transceiver comprised of a transmitter 200 and a receiver 220. At least the receiver 220 is assumed to be coupled to a plurality of receive antennas 240A, 240B for communication with the network operator. At least one local oscillator, such as a frequency synthesizer (SYNTH) 260, is provided for tuning the transceiver.

Figure 2:
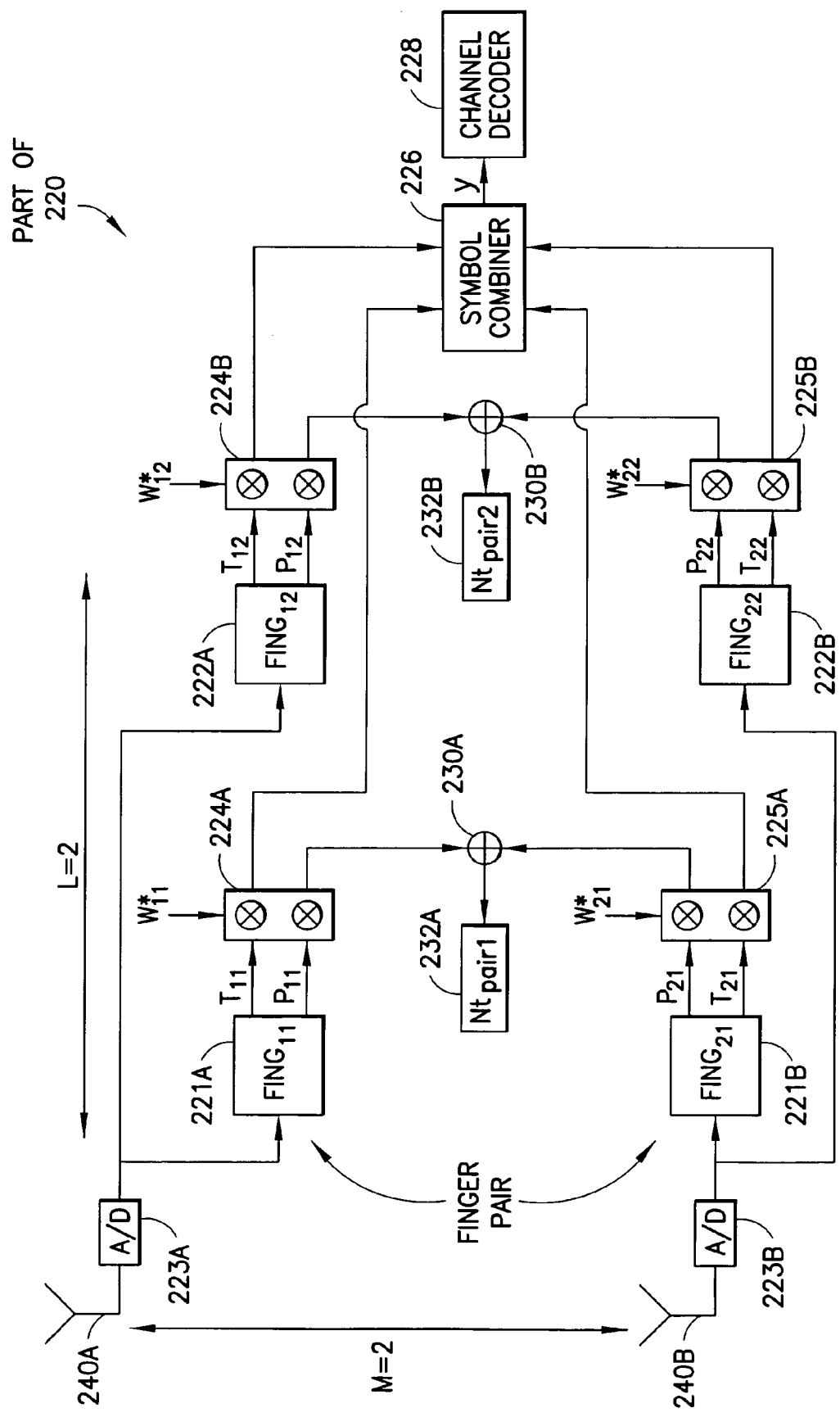
FIG. 2 is a block diagram of wireless transceiver with M receiver antennas (M=2 for simplicity) and L finger pairs (L=2 for simplicity) to collect signal energy of resolvable multipath components across time and space.
Figure 3A:
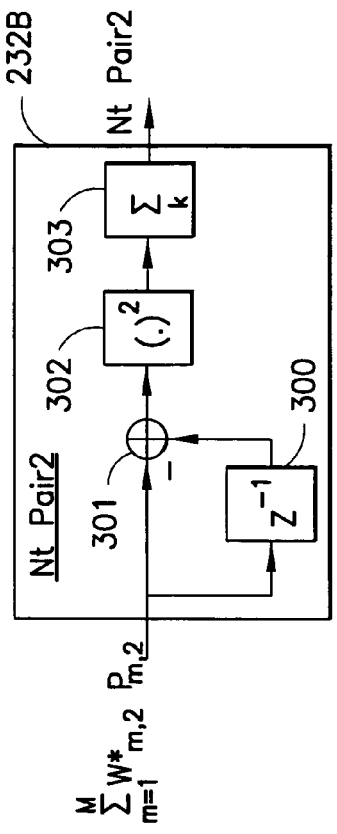
FIGS. 3A, 3B and 3C, collectively referred to as FIG. 3, show the Nt_Pair1 and Nt_Pair2 blocks of FIG. 2 (FIGS. 3A and 3B, respectively, and an unbiased SINR (Eb/Nt) estimation block (FIG. 3C) in accordance with the preferred embodiments of this invention.
Figure 3B:
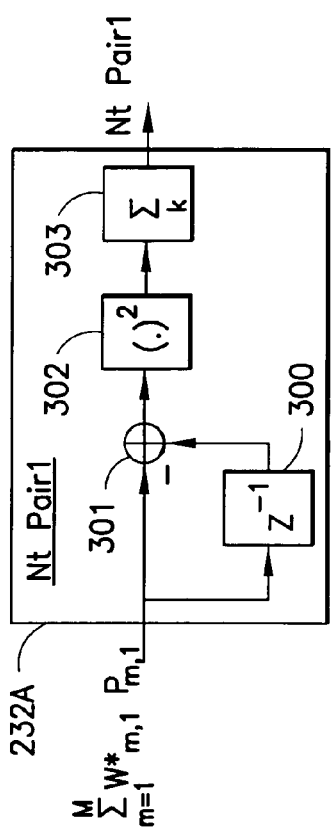
Figure 3C:
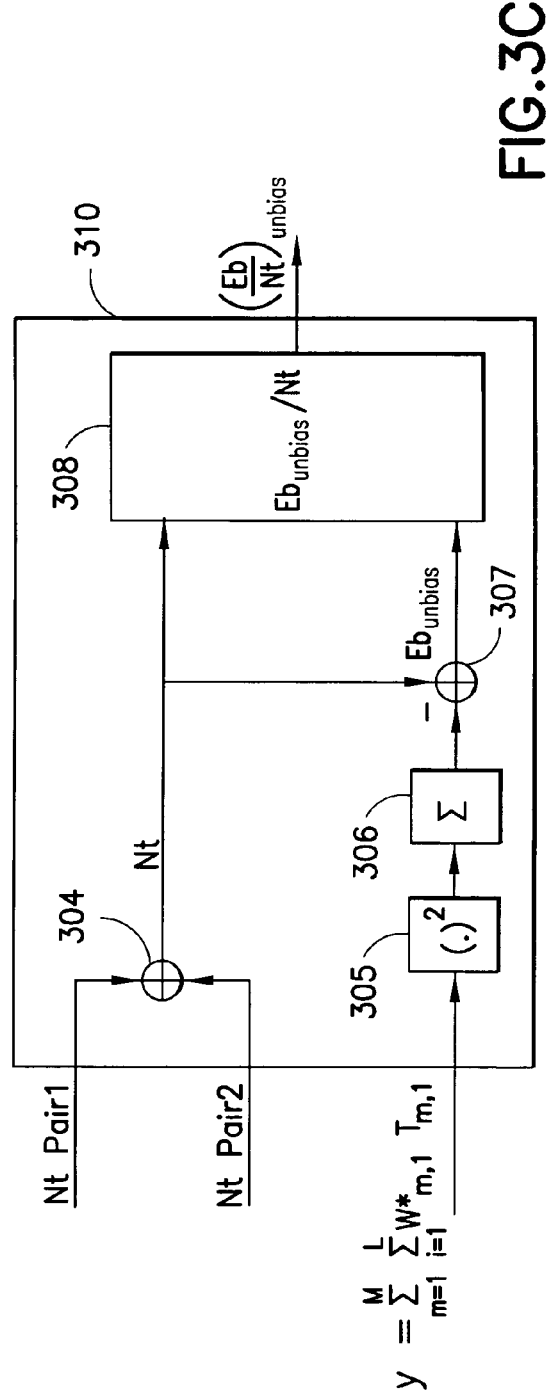

Of most interest to the presently preferred embodiments of this invention is the receiver 220, elements of which are shown in FIGS. 2 and 3 and discussed in detail below.

FIG. 2 illustrates a portion of the receiver 220 of FIG. 1 with M=2 receiver antennas 240A, 240B and two analog to digital (A/D) converters 223A, 223B feeding L=2 finger pairs 221A, 221B and 222A, 222B. The finger pairs 221, 222 collect the signal energy of the resolvable multipath components across time and space. In this example it is assumed that there are two resolvable multipaths, resulting in the use of the two finger pairs 221, 222. In other embodiments there may be more or less than two resolvable signal multipaths, and hence more or less than two finger pairs 221, 222. Each finger member of a finger pair 221, 222 (correlator) outputs pilot and traffic symbols, $P_{m,l}$ and $T_{m,l}$ respectively. The traffic symbols are weighted in weighting blocks 224A, 224B, and 225A, 225B by $w_{m,l}$ prior to application to a symbol combiner 226. The combined traffic symbol is then fed to a channel decoder 228 for bit demodulation. The pilot symbols are also weighted by $w_{m,l}$ and combined in pairs (i.e., combined in order of corresponding finger pair member fingers 221A, 221B, and 222A, 222B) in summing junctions 230A, 230B. The resultant weighted and space-combined pilot symbols are input to respective Nt estimation blocks 232A, 232B, shown in FIGS. 3A and 3B as Nt_Pair1 and Nt_Pair2, respectively. The values for the weights $w_{m,l}$ depicted in FIG. 2 may be derived using, as presently preferred but non-limiting examples, an MRC or an O.C. MMSE based combiner schemes.

FIG. 3 shows in further detail the various elements of the presently preferred SINR estimation technique. In FIGS. 3A and 3B it can be seen that the identically constructed Nt estimation blocks 232A, 232B estimate the noise plus interference from the space-combined pilot symbols through subtraction of two consecutive symbols (one symbol delay line 300 and subtractor node 301), the difference value then being squared (block 302) and averaged over k symbols (block 303). The estimated noise plus interference from each finger pair is next summed over L active finger pairs to produce the total noise estimate Nt in block 304, which forms a part of an unbiased Eb/Nt estimator 310. The signal energy at the decoder input (Eb) is computed by squaring and averaging the traffic symbol combiner output (y) in blocks 305 and 306. The Nt estimate is then subtracted from Eb in subtractor 307 to remove the bias term. The unbiased Eb estimation is then divided by Nt in block 308 to provide the SINR estimate (Eb/Nt) used for power control and other processing tasks in the MS 100 (or in the BS 50). As a non-limiting example k may equal 24 symbols (corresponding to one Power Control Group) in the IS-95 and IS-2000 systems.

It should be noted that the functionality of FIGS. 2 and 3 may be realized in hardware, or in software, or in a combination of hardware and software (DSP or MCU). For example, and as will be made more apparent below, a number of the foregoing operations are amenable to being implemented by software instructions executed by the DSP 180 shown in FIG. 1.

The foregoing operations will now be discussed in greater detail. It is pointed out that the presently preferred embodiments of this invention provide for determining the SINR when a single or multiple antennas are used at the receiver of a wireless CDMA modem, and although the analysis is presented for the case of two antennas 240A, 240B and two finger pairs 221, 222 for simplicity, the use of the presently preferred embodiments of this invention can be readily extended to the generic case of M receiver antennas and L fingers. In the following a detailed analysis of the calculation of the SINR is provided for M=2, L=2, which is thus not to be construed as a limitation upon the use or scope of the presently preferred embodiments of this invention.

Consider a received signal transmitted over a frequency fading selective channel (two path fading) and corrupted by additive white noise and received by the two antennas 240A, 240B. The received signal is A/D converted in blocks 223 and sampled at one sample per chip at the input of each assigned finger 221, 222 (correlator). Without loss of generality the following derivation is carried out for a CDMA system using Quadrature Phase Shift Keying (QPSK) modulation. It is assumed that each finger pair 221, 222 utilizes the same PN phase to despread the assigned multipath component, and ideal timing recovery is assumed for convenience. Given these conditions the traffic symbol expression at the output of each correlator 221, 222 is given by:

$$T_{11}(k) = \alpha_{11}\sqrt{E_t}\tilde{S}_k + n_{t11}(k) \quad (1)$$

$$T_{21}(k) = \alpha_{21}\sqrt{E_t}\tilde{S}_k + n_{t21}(k) \quad (2)$$

$$T_{12}(k) = \alpha_{12}\sqrt{E_t}\tilde{S}_k + n_{t_{12}}(k) \quad (3)$$

$$T_{22}(k) = \alpha_{22}\sqrt{E_t}\tilde{S}_k + n_{t_{22}}(k) \quad (4)$$

where $$\tilde{S}_k = \frac{\pm 1}{\sqrt{2}} \pm j\frac{\pm 1}{\sqrt{2}}$$

are the QPSK modulated encoded symbols with unit energy, $\alpha_{m,l}$ m ∈ {1,2 ... M}, l ∈ {1,2 ... L} are the channel complex coefficient with Rayleigh distributed amplitude and uniform phase, $E_t$ is the traffic symbol energy at the correlator output given by $N_t^2 E_{ct}$, $N_t$ is the traffic symbol correlation length and $E_{ct}$ is the traffic chip energy. In this case $n_{t_{m,l}}$ is the traffic noise term at the output of each correlator 221, 222. The traffic noise term has two components: a white component ($n_w$) and a space colored component ($n_I$) produced by dominant cochannel interference. Expanding the noise term of the traffic symbols yields:

$$n_{t_{11}}(k) = n_{w_{11}}{}^t(k) + \alpha_{12}n_{I_2 \to 1}{}^t(k) \quad (5)$$

$$n_{t_{21}}(k) = n_{w_{21}}{}^t(k) + \alpha_{22}n_{I_2 \to 1}{}^t(k) \quad (6)$$

$$n_{t_{12}}(k) = n_{w_{12}}{}^t(k) + \alpha_{11}n_{I_1 \to 2}{}^t(k) \quad (7)$$

$$n_{t_{22}}(k) = n_{w_{22}}{}^t(k) + \alpha_{21}n_{I_1 \to 2}{}^t(k) \quad (8)$$

where $n_{I_1 \to 2}$ represents the multipath interference (in amplitude) of path 1 on path 2 at the correlator, 222 output. In analogous manner, $n_{I_2 \to 1}$ is the multipath interference (in amplitude) of path 2 on path 1 at the output of correlator 221.

The interference components for each finger pair 221, 222 differ only by the fading coefficient as seen by comparing Eqs. (5) with (6) and (7) with (8). In fact, each finger pair 221, 222 utilizes the same PN phase and Walsh code to despread the fading signal, plus interference, received at each antenna branch. The fading coefficient, although independent for each path, slowly varies in time at the speed of interest and therefore can be considered as a complex constant during a Power Control Group (PCG) interval (e.g., 1.25 msec in IS-2000). For the foregoing reasons, the interference terms are highly correlated across the antennas during a PCG interval.

The statistics of the white noise terms are as follows:

$$(n_{w_{m,l}}{}^t) \sim N(0, N_t I_{OC}) \quad (9)$$

$$(n_{w_{m,l}}{}^P) \sim N(0, N_p I_{OC}) \quad (10)$$

The statistics of the interference terms averaged over the fading coefficients are:

$$n_{I_1 \to 2}{}^t, n_{I_2 \to 1}{}^t \sim N(0, N_t I_{or}) \quad (11)$$

$$n_{I_1 \to 2}{}^P, n_{I_2 \to 1}{}^P \sim N(0, N_p I_{or}) \quad (12)$$

where $N(0,\sigma^2)$ denotes Gaussian distribution with zero mean and variance $\sigma^2$, and where it is assumed that $E[|\alpha_{m,l}|^2] = 1$.

The expression of the pilot symbols at the correlator 221, 222 output is given by:

$$P_{m,l}(k) = \alpha_{m,l}\sqrt{E_P} + n_{P_{m,l}}(k) \quad (13)$$

where $E_P = N_p^2 E_{cp}$, and where $N_p$ is the pilot symbol correlation length and $E_{cp}$ is the pilot chip energy.

The pilot noise components expression is given by:

$$n_{P_{11}}(k) = n_{w_{11}}{}^P(k) + \alpha_{12}n_{I_2 \to 1}{}^P(k) \quad (14)$$

$$n_{P_{21}}(k) = n_{w_{21}}{}^P(k) + \alpha_{22}n_{I_2 \to 1}{}^P(k) \quad (15)$$

$$n_{P_{12}}(k) = n_{w_{12}}{}^P(k) + \alpha_{11}n_{I_1 \to 2}{}^P(k) \quad (16)$$

$$n_{P_{22}}(k) = n_{w_{22}}{}^P(k) + \alpha_{21}n_{I_1 \to 2}{}^P(k) \quad (17)$$

Each traffic symbol is multiplied in blocks 224, 225 by its respective weight (complex conjugate) for coherent combining.

The combiner 226 output symbol is thus given by:

$$y(k) = \sum_{m=1}^{M} \sum_{l=1}^{L} w_{m,l}^*(k) T_{m,l}(k) \quad (18)$$

The true energy of the traffic symbol at the input to the channel decoder 228 is given by:

$$E_b = |E[y]|^2 = \left| \sum_{m=1}^{M} \sum_{l=1}^{L} w_{m,l}^* \alpha_{m,l} \right|^2 E_t \quad (19)$$

where Eqs. (1) ... (4) have replaced "T" in Eq. (18). For practical purposes, however, the bit energy in the modem is computed by taking the expected value of the square of Eq. (18) which includes noisy terms. Limiting the computation to a single finger pair 221 or 222, the energy of the space combined traffic symbol is given by:

$$\begin{aligned} E_{b_{Modem}|Pair1} &= E\left[|w_{11}^*(\alpha_{11}\sqrt{E_t}\tilde{S}_k + n_{t_{11}}) + w_{21}^*(\alpha_{21}\sqrt{E_t}\tilde{S}_k + n_{t_{21}})|^2\right] = \\ &= E\left[|w_{11}^*(\alpha_{11}\sqrt{E_t}\tilde{S}_k + n_{w_{11}}^t(k) + \alpha_{12}n_{I_2 \to 1}^t) + w_{21}^*(\alpha_{21}\sqrt{E_t}\tilde{S}_k + n_{w_{21}}^t + \alpha_{22}n_{I_2 \to 1}^t)|^2\right] = \\ &= (|w_{11}|^2|\alpha_{11}|^2 + |w_{21}|^2|\alpha_{21}|^2 + 2\,\mathrm{Re}[w_{11}^* w_{21} \alpha_{11}\alpha_{12}^*])E_t + (|w_{11}|^2 + |w_{21}|^2)I_{oc} + \\ &\quad + (|w_{11}|^2|\alpha_{12}|^2 + |w_{21}|^2|\alpha_{22}|^2 + 2\,\mathrm{Re}[w_{11}^* w_{21} \alpha_{12}\alpha_{22}^*])I_{or} \end{aligned} \quad (20)$$

As can been seen from Eq. (20), the energy of the coherently combined traffic symbols contains a term proportional to the signal energy and two terms proportional to the white noise component ($I_{oc}$), and to the space-colored multipath interference ($I_{or}$), respectively. In order to provide an estimate of the bias term, and to capture the space-correlated noise contributions terms, the following procedure is presently preferred for use:

a) Estimate the noise level from the coherently combined pilot symbols across the space dimension; and b) Sum the L power values computed in a) to account for all of the finger pairs in the time dimension.

The second step (b) is justified by the multipath noise terms being uncorrelated in time due to different PN phases, and by recalling that the PN period is much longer than the Walsh code length $N_r$.

The noise plus interference estimate can be computed by calculating the variance of the noise symbols over a PCG. The preferred method is to compute the noise plus interference by subtracting two consecutive pilot symbols (see blocks 300 and 301 in FIGS. 3A and 3B) as follows.

The noise estimation is given by:

$$Nt_{|Pair1} = \frac{1}{2}E[|w_{11}^*(k)P_{11}(k) + w_{21}^*(k)P_{21}(k) - (w_{11}^*(k-1)P_{11}(k-1) + w_{21}^*(k-1)P_{21}(k-1))|^2] \quad (21)$$

Substituting Eqs. (14) through (17) into Eq. (21), and assuming each fading coefficient constant across two consecutive pilot symbols, leads to $$NT_{Pair1} = (|w_{11}|^2 + |w_{21}|^2)I_{oc} + (|w_{11}|^2|\alpha_{12}|^2 + |w_{21}|^2|\alpha_{22}|^2 + 2\,Re[w_{11}^*w_{21}\alpha_{12}\alpha_{22}^*])I_{or} \quad (22)$$

As can be seen, Eq. (22) provides the estimate of the noise plus interference power of the coherently combined traffic symbols as it appears in (20). The overall noise term at the decoder 228 input is then given by:

$$Nt = \sum_{l=1}^{L} Nt_{Pair_l} \quad (23)$$

Eb/Nt is obtained as the ratio of Eq. (20) and Eq. (23), namely $$\frac{E_b}{N_t} = \frac{E[|y|^2]}{N_t}.$$

The preferred method is to remove the bias term from (20) as follows:

$$\frac{E_b}{Nt} = \frac{E[|y|^2] - Nt}{Nt} \quad (24)$$

In the presently preferred, yet non-limiting embodiments of this invention the dual antenna receiver 220 is used, where the noise term pertaining to each finger member pair 221A, 222B and 222A, 222B, is computed independently and then summed. As was noted above, the calculation of Eb and Nt can be performed in hardware or in software (or by a combination of both). A presently preferred noise estimation procedure uses the difference as shown in Eq. (21), while a presently preferred Eb estimation procedure removes the bias as shown in Eq. (24).

As can be appreciated, the presently preferred embodiments of this invention provide circuits and methods to utilize signals from multiple antennas (240A, 240B) and multiple assigned fingers (221, 222) in such a way as to realize an improved SINR estimate that takes into account the space-correlated interference, whether produced by multipath or by dominant neighbor BS(s). The determined SINR estimate represents the effective Eb/Nt as seen at the decoder input. This information may be used by the MS 100 for Forward Power Control processing, and/or for other purposes where the presence of an accurate SINR estimate would be beneficial. Further, the SINR estimation method proposed is flexible and is suitable for use with, as non-limiting examples, MRC or O.C. (based on MMSE criteria) receiver diversity schemes.

As was noted, the improved SINR estimate obtained in accordance with the preferred embodiments of this invention may be employed by several algorithms in the MS 100/BS 50 modem. The presently preferred embodiments of this invention, although presented in the context of the MS 100, can be readily extended to the BS 50, such as one implementing a reverse power control procedure. Thus, while the above description has presented the use of the SINR estimate in the context of the FPC algorithm, the use of the improved SINR estimate is not limited for use with only this one important application.

Figure 4:
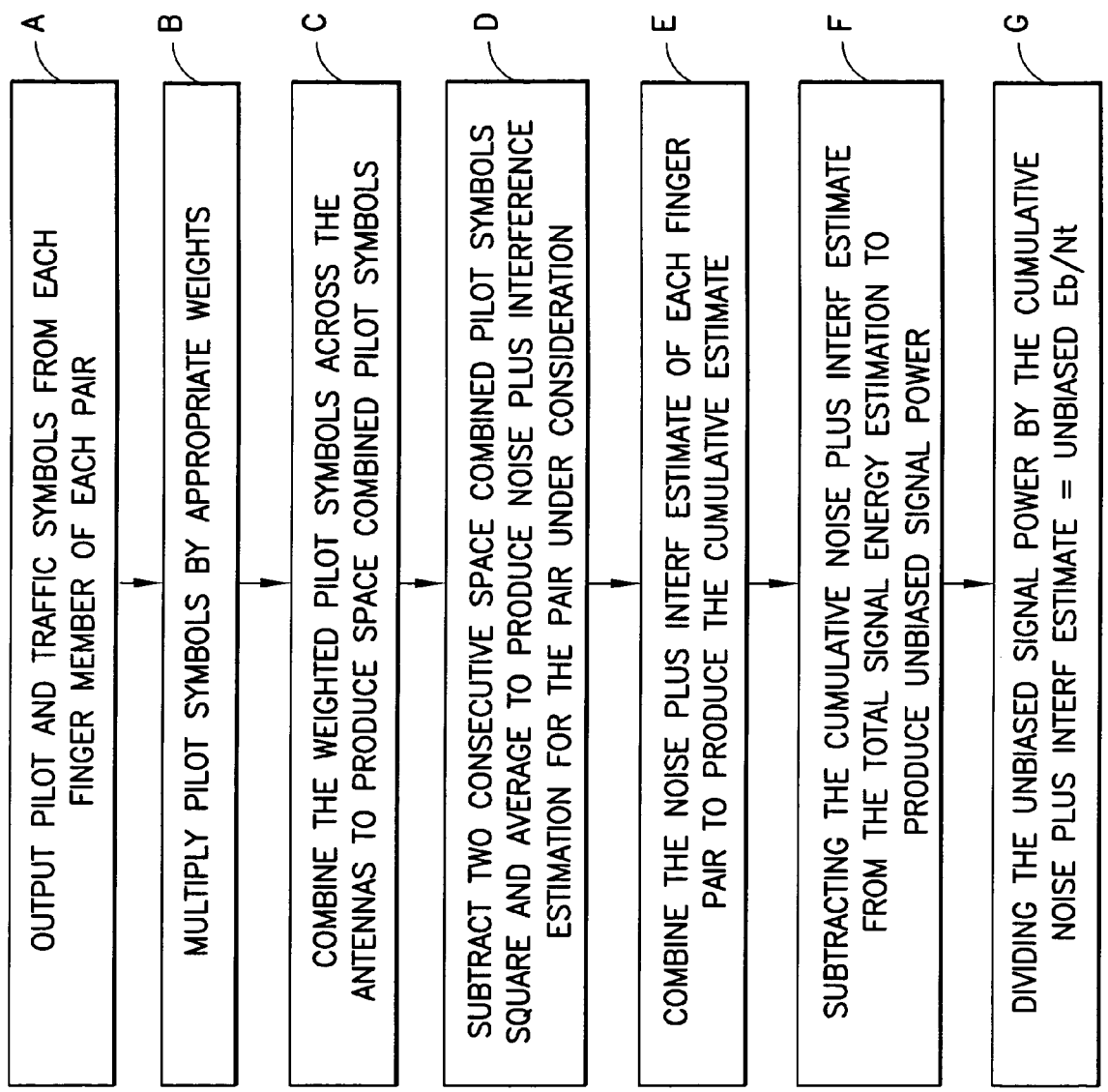
FIG. 4 is a logic flow diagram in accordance with a method that forms a part of the preferred embodiments of this invention.

Based on the foregoing description, and referring to FIG. 4, it can be appreciated that an aspect of this invention is a method to operate the receiver 220, and includes (Step A) applying signals received from at least first and second antennas (240A, 240B) to L finger pairs, where L represents the number of resolvable multipaths at a given instant in time. Each finger pair comprises a first finger member 221A, 222A and a second finger member 221B, 222B. The method outputs traffic symbols and pilot symbols from each finger member. Step B multiplies the pilot symbols by their respective weights obtained from, for example, MRC or O.C. schemes. Step C space combines the weighted pilot symbols output from the first finger members and from the second finger members, and Step D subtracts two consecutive space combined pilot symbols, then squares and averages to produce the noise plus interference estimation for the path under consideration. Step E combines the noise plus interference estimates produced by each finger pair to generate a cumulative (global) noise estimate. Step F subtracts the cumulative noise plus interference estimate from an estimate of the total signal energy input to a channel decoder to generate an unbiased total signal estimate. Step G divides the unbiased total signal estimate by the cumulative noise plus interference estimate to obtain an unbiased signal to interference plus noise ratio estimate that accounts for both (space) correlated and uncorrelated interference contributions.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent circuit architectures may be attempted by those skilled in the art, and more (or less) than two receive antennas may be employed as well.

For example, for a case where only one antenna is used as a design choice, or as a result of failure of a second antenna, the input to Nt estimation block 232A (and also 232B if more than one resolvable signal is being processed) would be the weighted output from only one finger (221A), and finger 221B (if present) can be shut off.

However, all such and similar modifications of the teachings of this invention will still fall within the scope of this invention.

Furthermore, some of the features of the presently preferred embodiments of this invention could be used to advantage without the corresponding use of other features. As such, the foregoing description should be considered as merely illustrative of the principles of the present invention, and not in limitation thereof.

What is claimed is:

1. A method, comprising: applying signals received from at least first and second antennas to L finger pairs, where L is $\geq 1$, in accordance with resolvable signal paths, each finger pair comprising a first finger member and a second finger member, wherein the at least first antenna provides a signal to the first finger member of each of 1 through L finger pairs and the at least second antenna provides a signal to the second finger member of each of 1 through L finger pairs;

outputting traffic symbols directed to weighting and pilot symbols directed to weighting from each finger member;

weighting each of the traffic symbols and the pilot symbols output by a corresponding finger member by a weighting factor unique to the corresponding finger member;

space combining weighted pilot symbols output from the finger members of each pair to produce a noise plus interference estimation for a specific finger pair under consideration;

combining the noise plus interference estimations of output of each finger pair to generate a cumulative noise plus interference estimate, as seen at a channel decoder input;

subtracting the cumulative noise plus interference estimate from an estimate of the total signal energy input at the channel decoder input to generate an unbiased total signal estimate; and dividing the unbiased total signal estimate by the cumulative noise plus interference estimate to obtain an unbiased signal to interference plus noise ratio estimate that accounts for space correlated and uncorrelated interference contributions.

2. A method as in claim 1, where space combining comprises estimating the noise plus interference from space-combined pilot symbols by subtracting two consecutive pilot symbols, squaring the difference and averaging the squared difference over a plurality of symbols.

3. A method as in claim 1, where combining comprises summing the estimated noise plus interference from each finger pair over all active finger pairs to produce the cumulative noise plus interference estimate, and where the signal energy at the decoder input is determined by squaring and averaging noise output from a traffic symbol combiner.

4. A method as in claim 1, where the spatially correlated interference arises from at least one of inter-cell interference and intra-cell interference.

5. A method as in claim 1, where the traffic symbols and the pilot symbols are multiplied by complex weights prior to being combined.

6. A method as in claim 5, where traffic signals output from each finger member are weighted by their respective channel gain using weights output from one of a maximal ratio combiner or an optimal combiner based on minimum mean square error criteria.

7. An apparatus, comprising:

at least one pseudo-noise and Walsh code correlator pair, each said pseudo-noise and Walsh code correlator pair comprising a first correlator member and a second correlator member, each correlator member configured to receive input via an antenna that is a different antenna from an antenna from which an other correlator member of the pseudo-noise and Walsh code correlator pair is configured to receive input, wherein input to a correlator member is via a single antenna, each correlator member configured to output traffic symbols directed to weighting and pilot symbols directed to weighting;

a weighting block corresponding to each correlator member configured to multiply each of the traffic symbols and the pilot symbols of that correlator member by a same weighting factor unique to that correlator member;

a first combiner having inputs configured to receive weighted pilot symbols output by the weighting block and spatially combine the weighted pilot symbols to produce a noise plus interference estimate for a specific correlator pair under consideration;

a second combiner configured to produce from all summing junction pairs a cumulative noise plus interference estimate;

a subtractor configured to generate an unbiased total signal estimate by subtracting the cumulative noise plus interference estimate from an estimate of signal energy input to a channel decoder that represents weighted and combined traffic symbols from all of said pseudo-noise code correlator pairs; and a divider configured to receive inputs from an output of the second combiner and an output of the subtractor and configured to output an unbiased signal to interference plus noise ratio estimate by dividing the unbiased total signal estimate by the signal to noise estimate that accounts for both space correlated and uncorrelated interference terms.

8. An apparatus as in claim 7, where each of said first and second combiners is operable to estimate the noise plus interference from the space-combined pilot symbols, and comprises a subtractor to subtract two consecutive pilot symbols, a squarer to square the difference between the two consecutive pilot symbols and an averager to average the squared difference over a plurality of symbols.

9. An apparatus as in claim 8, where the third combiner comprises functionality to sum the estimated noise from each finger pair over all active finger pairs to produce the total noise plus interference estimate, and where the signal energy at the decoder input is determined by functionality to square and average an output of a traffic symbol combiner.

10. An apparatus as in claim 7, where the spatially correlated interference arises from at least one of inter-cell interference and intra-cell multipath.

11. An apparatus as in claim 7, where the traffic symbols and the pilot symbols are multiplied by complex weights prior to being combined.

12. An apparatus as in claim 11, where the weights are output from a maximal ratio combiner.

13. An apparatus as in claim 11, where the weights are output from an optimal combiner.

14. An apparatus as in claim 11, where the weights are based on a minimum mean square error criteria.

15. An apparatus as in claim 7, embodied as a radio frequency receiver of a mobile station.

16. An apparatus as in claim 7, embodied as a radio frequency receiver of a base station.

17. An apparatus as in claim 7, where more than one finger pair is employed to collect the energy from multipath propagation.

18. A mobile station comprising:
- a radio frequency transceiver, said transceiver comprising at least one spreading code correlator pair comprising a first correlator member and a second correlator member, each correlator member configured to receive input via an antenna that is a different antenna from an antenna which another correlator member of a spreading code correlator pair is configured to receive input, wherein input to a correlator member is via a single antenna, each correlator member configured to output traffic symbols directed to weighting and pilot symbols directed to weighting;
- a weighting block for each correlator member configured to multiply each of the traffic symbols and the pilot symbols output by that correlator member by a same weighting factor unique to that correlator member;
- a first combiner having inputs configured to receive weighted pilot symbols output by the weighting block and spatially combine the weighted pilot symbols to produce a noise plus interference estimate for a specific correlator pair under consideration;
- a second combiner configured to produce from all summing junction pairs a cumulative noise plus interference estimate;
- a subtractor configured to generate an unbiased total signal estimate by subtracting the cumulative noise plus interference estimate from an estimate of signal energy input to a channel decoder that represents weighted and combined traffic symbols from all of said correlator pairs; and
- a divider configured to receive inputs from an output of the second combiner and to an output of the subtractor and configured to output an unbiased signal to interference plus noise ratio estimate by dividing the unbiased total signal estimate by the signal to noise estimate that accounts for both space correlated and uncorrelated interference terms.

19. A mobile station as in claim 18, where the traffic symbols and the pilot symbols are multiplied by complex weights prior to being combined, and where the weights are generated by a maximal ratio combiner.

20. A mobile station as in claim 18, where the traffic symbols and the pilot symbols are multiplied by complex weights prior to being combined, and where the weights are generated by an optimal combiner.

21. A mobile station as in claim 18, where the traffic symbols and the pilot symbols are multiplied by complex weights prior to being combined, and where the weights are generated using a minimum mean square error criteria.

22. A base station comprising:
- a radio frequency transceiver, said transceiver comprising at least one spreading code correlator pair comprising a first correlator member and a second correlator member, each correlator member configured to receive input via an antenna that is a different antenna from an antenna which an other correlator member of a spreading code correlator pair is configured to receive input, wherein input to a correlator member is via a single antenna, each correlator member configured to output traffic symbols directed to weighting and pilot symbols directed to weighting;
- a weighting block for each correlator member configured to multiply a corresponding each the traffic symbols and the pilot symbols of that correlator member by a same weighting factor unique to that correlator member;
- a first combiner having inputs configured to receive weighted pilot symbols output by the weighting block and spatially combine the weighted pilot symbols to produce a noise plus interference estimate for a specific correlator pair under consideration;
- a second combiner configured to produce from all summing junction pairs a cumulative noise plus interference estimate; a subtractor configured to generate an unbiased total signal estimate by subtracting the cumulative noise plus interference estimate from an estimate of signal energy input to a channel decoder that represents weighted and combined traffic symbols from all of said correlator pairs; and
- a divider, configured to receive inputs from an output of the second combiner and an output of the subtractor and configured to output an unbiased signal to interference plus noise ratio estimate by dividing the unbiased total signal estimate by the signal to noise estimate that accounts for both space correlated and uncorrelated interference terms.

23. A base station as in claim 22, where the traffic symbols and the pilot symbols are multiplied by complex weights prior to being combined, and where the weights are generated by a maximal ratio combiner.

24. A base station as in claim 22, where the traffic symbols and the pilot symbols are multiplied by complex weights prior to being combined, and where the weights are generated by an optimal combiner.

25. A base station as in claim 22, where the traffic symbols and the pilot symbols are multiplied by complex weights prior to being combined, and where the weights are generated using minimum mean square error criteria.

26. A radio frequency receiver, comprising:
- at least one spreading code correlator comprising at least one spreading code correlator pair comprising a first correlator member and a second correlator member, each correlator member configured to receive input via an antenna that is a different antenna from an antenna which an other correlator member of the corresponding spreading code correlator pair of a spreading code correlator pair is configured to receive input, wherein input to a correlator member is via a single antenna, each correlator member configured to output traffic symbols directed to weighting and pilot symbols directed to weighting;
- a weighting block for each correlator member configured to multiply each of the traffic symbols and pilot symbols of that correlator member by a same weighting factor unique to that correlator member;
- a first combiner having inputs configured to receive weighted pilot signals output by the weighting block and spatially combine the weighted pilot symbols to produce a noise plus interference estimate for a specific correlator pair under consideration;
- a second combiner configured to produce from all summing junction pairs a cumulative noise plus interference estimate;
- the first combiner comprising a subtractor configured to subtract two consecutive weighted pilot symbols, a squarer configured to square the difference between the two consecutive weighted pilot symbols and an averager configured to average the squared difference over a plurality of symbols; and
- a second combiner comprising an unbiased signal to interference plus noise ratio estimator comprising a subtractor configured to subtract a cumulative noise plus interference estimate from an estimate of signal energy input to a channel decoder, that represents weighted traffic symbols, to generate an unbiased total signal estimate, and a divider configured to output an unbiased signal to interference plus noise ratio estimate by dividing the unbiased total signal estimate by the cumulative noise plus interference estimate.

27. A computer readable medium including a computer readable program, wherein the computer readable program when executed by a computer causes the computer to operate a receiver, comprising operations of:

in response to signals received from at least first and second antennas and applied to L finger pairs, where L is $\geq 1$, in accordance with resolvable signal paths, each finger pair comprising a first finger member and a second finger member;

wherein the at least first antenna provides a signal to the first finger member of each of 1 through L finger pairs and the at least second antenna provides a signal to the second finger member of each of 1 through L finger pairs, outputting traffic symbols directed to weighting and pilot symbols directed to weighting from each finger member;

weighting each of the traffic symbols and the pilot symbols output by a corresponding finger member by a weighting factor unique to the corresponding finger member;

space combining weighted pilot symbols output from the finger members of each pair to produce a noise plus interference estimation for a specific finger pair under consideration;

combining the noise plus interference estimations of output of each finger pair to generate a cumulative noise plus interference estimate, as seen at a channel decoder input;

subtracting the cumulative noise plus interference estimate from an estimate of the total signal energy input at the channel decoder input to generate an unbiased total signal estimate; and dividing the unbiased total signal estimate by the cumulative noise plus interference estimate to obtain an unbiased signal to interference plus noise ratio estimate that accounts for space correlated and uncorrelated interference contributions.

28. A computer readable medium as in claim 27, where space combining comprises estimating the noise plus interference from space-combined pilot symbols by subtracting two consecutive pilot symbols, squaring the difference and averaging the squared difference over a plurality of symbols.

29. A computer readable medium as in claim 27, where combining comprises summing the estimated noise plus interference from each finger pair over all active finger pairs to produce the cumulative noise plus interference estimate, and where the signal energy at the decoder input is determined by squaring and averaging noise output from a traffic symbol combiner.

30. A computer readable medium as in claim 27, where the spatially correlated interference arises from at least one of inter-cell interference and intra-cell interference.

31. A computer readable medium as in claim 27, where the traffic symbols and the pilot symbols are multiplied by complex weights prior to being combined.

32. A computer readable medium as in claim 31, where traffic signals output from each finger member are weighted by their respective channel gain using weights output from one of a maximal ratio combiner or an optimal combiner based on minimum mean square error criteria.

33. A radio frequency receiver comprising an input for coupling to at least two antennas, further comprising at least one pseudo-noise and Walsh code correlator pair means, each said pseudo-noise and Walsh code correlator pair means comprising first correlator means and second correlator means, each correlator means configured to receive input via an antenna that is a different antenna from an antenna which another correlator means of a pseudo-noise and Walsh code correlator pair means is configured to receive input, wherein input to a correlator means is via a single antenna, each correlator means configured to output traffic symbols directed to weighting and pilot symbols directed to weighting;

a weighting block for each correlator member configured to multiply each of the traffic and pilot symbols output by that correlator member by a same weighting factor unique to that correlator means;

further comprising first combiner means having inputs configured to receive weighted pilot symbols output by the weighting block and spatially combine the weighted pilot symbols to produce a noise plus interference estimate for a specific correlator pair means under consideration;

second combiner means configured to produce from all active summing junction pair means a cumulative noise plus interference estimate;

subtractor means configured to generate an unbiased total signal estimate by subtracting the cumulative noise plus interference estimate from an estimate of signal energy input to channel decoder means that represents weighted and combined traffic symbols from all of said pseudo-noise code correlator pair means; and divider means configured to receive inputs from an output of the second combiner and an output of the subtractor and configured to output an unbiased signal to interference plus noise ratio estimate by dividing the unbiased total signal estimate by the signal to noise estimate that accounts for both space correlated and uncorrelated interference terms.

34. A radio frequency receiver as in claim 33, where each of said first and second combiner means is operable for estimating the noise plus interference from the space-combined pilot symbols, and comprises means for subtracting two consecutive pilot symbols, means for squaring the difference between the two consecutive pilot symbols and means for averaging the squared difference over a plurality of symbols.

35. A radio frequency receiver as in claim 33, where the spatially correlated interference arises from at least one of inter-cell interference and intra-cell multipath.

36. A radio frequency receiver as in claim 33 where the traffic symbols and the pilot symbols are multiplied by complex weights prior to being combined, where the weights are output from one of maximal ratio combiner means and optimal combiner means.

* * * * *